United States Patent
Kim et al.

(10) Patent No.: US 9,603,072 B2
(45) Date of Patent: Mar. 21, 2017

(54) METHOD AND APPARATUS FOR CHANGING PROXIMITY SERVICE-BASED RADIO ACCESS TECHNOLOGY

(71) Applicant: LG ELECTRONICS INC., Seoul (KR)

(72) Inventors: Laeyoung Kim, Seoul (KR); Jaehyun Kim, Seoul (KR); Taehyeon Kim, Seoul (KR); Hyunsook Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/769,975

(22) PCT Filed: Mar. 13, 2014

(86) PCT No.: PCT/KR2014/002104
§ 371 (c)(1),
(2) Date: Aug. 24, 2015

(87) PCT Pub. No.: WO2014/142570
PCT Pub. Date: Sep. 18, 2014

(65) Prior Publication Data
US 2016/0007257 A1    Jan. 7, 2016

Related U.S. Application Data

(60) Provisional application No. 61/785,780, filed on Mar. 14, 2013, provisional application No. 61/812,223, (Continued)

(51) Int. Cl.
*H04W 36/14* (2009.01)
*H04W 76/06* (2009.01)
*H04W 36/00* (2009.01)

(52) U.S. Cl.
CPC ......... *H04W 36/14* (2013.01); *H04W 76/064* (2013.01); *H04W 36/0022* (2013.01); *H04W 36/0033* (2013.01)

(58) Field of Classification Search
None
See application file for complete search history.

(56) References Cited

U.S. PATENT DOCUMENTS

2009/0258671 A1* 10/2009 Kekki ................ H04W 76/027
455/552.1
2010/0113010 A1* 5/2010 Tenny .................... H04L 12/66
455/423
(Continued)

FOREIGN PATENT DOCUMENTS

KR    10-2009-0005601 A    1/2009
KR    10-2009-0117077 A    11/2009
(Continued)

OTHER PUBLICATIONS

Qualcomm Incorporated, "Correction of PS suspension procedure in CSFB to GERAN A/Gb mode," 3GPP TSG SA WG2 Meeting #85 S2-112374, May 16-20, 2011, Xi'An, P.R. China, 8 pages.
(Continued)

*Primary Examiner* — Brian Roberts
(74) *Attorney, Agent, or Firm* — Dentons US LLP (57) ABSTRACT

The present invention relates to a method and an apparatus for changing a radio access technology (RAT) of a terminal in a wireless communication system. More specifically, the method according to the present invention comprises the steps of: transmitting user traffic session related information when a terminal perceives that a packet switched service will be discontinued while carrying out proximity service (ProSe); and changing, by a first terminal, to a target RAT, in which PS service is not supported.

10 Claims, 4 Drawing Sheets

Related U.S. Application Data filed on Apr. 15, 2013, provisional application No. 61/842,960, filed on Jul. 3, 2013, provisional application No. 61/872,851, filed on Sep. 3, 2013.

(56) References Cited

U.S. PATENT DOCUMENTS

| | | | |
|---|---|---|---|
| 2010/0182971 A1* | 7/2010 | Chin | H04W 76/026 370/329 |
| 2010/0265914 A1* | 10/2010 | Song | H04W 48/18 370/331 |
| 2011/0090872 A1* | 4/2011 | Dahlen | H04W 36/0022 370/332 |
| 2013/0051362 A1* | 2/2013 | Lee | H04W 36/30 370/331 |
| 2014/0018079 A1* | 1/2014 | Xing | H04W 36/0022 455/437 |
| 2016/0034082 A1 | 2/2016 | Zhang et al. | |

FOREIGN PATENT DOCUMENTS

| | | |
|---|---|---|
| KR | 10-2012-0090456 A | 8/2012 |
| KR | 10-2012-0103070 A | 9/2012 |
| KR | 10-2013-0016222 A | 2/2013 |
| WO | 2008002997 A2 | 1/2008 |

OTHER PUBLICATIONS

Qualcomm Incorporated, "Meaning of "out of network" operation for ProSe," SA WG2 Meeting #95, Prague, Czech Republic, Jan. 28-Feb. 1, 2013, S2-130310, 3 pages.

* cited by examiner

METHOD AND APPARATUS FOR CHANGING PROXIMITY SERVICE-BASED RADIO ACCESS TECHNOLOGY

This application is a 35 USC §371 National Stage entry of International Application No. PCT/KR2014/002104 filed on Mar. 13, 2014, and claims priority to U.S. Provisional Application Nos. 61/785,780 filed on Mar. 14, 2013, 61/812,223 filed on Apr. 15, 2013, 61/842,960 filed on Jul. 3, 2013 and 61/872,851 filed on Sep. 3, 2013, all of which are hereby incorporated by reference in their entireties as if fully set forth herein.

TECHNICAL FIELD

The present description relates to a wireless communication system and, more specifically, to a method and apparatus for changing proximity service-based radio access technology (RAT).

BACKGROUND ART

Proximity service (ProSe) refers to a scheme for supporting communication between devices located physically close to each other. Specifically, ProSe is aimed to discover an application operating devices which are in proximity and, ultimately, to support exchange of data related to the application. For example, it may be considered that ProSe is applied to applications such as social network services (SNS), commerce, and games.

ProSe may also be called device-to-device (D2D) communication. That is, ProSe refers to a communication scheme for establishing a direct link between a plurality of devices (e.g., user equipments (UEs)) and thus directly exchanging user data (e.g., audio, multimedia data, etc.) between the devices without going via a network. ProSe communication may include UE-to-UE communication, Peer-to-Peer communication, etc. In addition, ProSe communication may be applied to Machine-to-Machine (M2M) communication, Machine Type Communication (MTC), etc. Accordingly, ProSe is considered as one solution to reduce the burden of a base station due to rapidly increasing data traffic. Besides, by adopting ProSe, effects such as reduction in procedures of a base station, reduction in power consumption of devices which participate in ProSe, increase in data transmission speed, increase in network capacity, load distribution, cell coverage expansion, etc. can be expected.

DISCLOSURE

Technical Problem

While the necessity of introduction of ProSe is under discussion, detailed plans with respect to a mechanism for supporting and controlling ProSe have not been developed.

An object of the present invention is to provide a method for performing efficient communication when packet switched handover is not supported during RAT change with regard to a ProSe based communication mechanism.

The technical problems solved by the present invention are not limited to the above technical problems and those skilled in the art may understand other technical problems from the following description.

Technical Solution

In an aspect of the present invention, a method for changing radio access technology (RAT) of a first user equipment (UE) in a wireless communication system includes: transmitting information related to a user traffic session when the first UE recognizes suspension of a packet switched service during execution of proximity service (ProSe) communication; and the first UE changing RAT to a target RAT in which PS service is not supported.

The target RAT may be a UTRAN (UMTS (Universal Mobile Telecommunications System) Terrestrial Radio Access Network)) or GERAN (GSM (Global System for Mobile Communication)/EDGE (Enhanced Data rates for Global Evolution) Radio Access Network).

The user traffic session may be one of an IP flow, IP traffic, a packet switched service, IP connection, bearer and PDN connection.

The method may further include transmitting the user traffic session related information to a second UE corresponding to a ProSe communication target of the first UE, wherein the user traffic session related information includes at least one of suspension of the user traffic session, release of the user traffic session, reason for suspension of the user traffic session, switching information of a ProSe communication path, information on suspension of ProSe communication, information on release of ProSe communication, information on whether the second UE is present within a network coverage and notification of unavailability of ProSe. The method may further include transmitting a request message for switching the ProSe communication path to an infrastructure path to a serving mobility management entity (MME) of the first UE.

The method may further include performing at least one of operation of releasing the user traffic session, operation of releasing resources allocated to the user traffic session, operation of releasing a user traffic session related context and operation of deactivating the user traffic session.

The method may further include performing at least one of operation of suspending the user traffic session, operation of suspending resources allocated to the user traffic session, operation of suspending a user traffic session related context and operation of deactivating the user traffic session.

The method may further include offloading an IP flow being ProSe-communicated to a wireless local area network (WLAN).

The method may further include performing a voice call according to circuit switched fallback (CSFB).

In another aspect of the present invention, provided herein is a UE changing RAT in a wireless communication system, including: a radio frequency (RF) unit; and a processor, wherein the processor is configured to transmit user traffic session related information upon recognizing suspension of a packet switched service during execution of proximity service (ProSe) communication and to change RAT to a target RAT in which PS service is not supported.

Advantageous Effects

According to the present invention, it is possible to efficiently perform communication when RAT is changed during ProSe communication.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

Specific terms used in the embodiments of the present invention are provided to aid in understanding of the present invention. These specific terms may be replaced with other terms within the scope and spirit of the present invention.

In some instances, known structures and devices are omitted, or are shown in block diagram form focusing on important features of the structures and devices, so as not to obscure the concept of the present invention. The same reference numbers will be used throughout this specification to refer to the same or like parts.

The embodiments of the present invention can be supported by standard documents disclosed for at least one of wireless access systems, Institute of Electrical and Electronics Engineers (IEEE) 802, 3GPP, 3GPP LTE, LTE-A and 3GPP2. Steps or parts that are not described to clarify the technical features of the present invention can be supported by those documents. Further, all terms as set forth herein can be explained by the standard documents.

The following features can be used for various wireless communication systems. For clarity, this application focuses on 3GPP LTE and 3GPP LTE-A. However, the technical features of the present invention are not limited thereto.

Terms used in the specification are defined as follows.

Universal Mobile Telecommunications System (UMTS): a third-generation mobile communication technology based on Global System for Mobile communication (GSM), developed by the 3GPP.

Evolved Packet System (EPS): a network system constituted by an Evolved Packet Core (EPC), which is an IP based packet switched core network, and an access network such as LTE and UTRAN, which is a network evolved from UMTS.

NodeB: a base station of GERAN/UTRAN, which is installed outdoors and has a macro cell sized coverage.

eNodeB: a base station of LTE, which is installed outdoor and has a macro cell sized coverage User Equipment (UE): a user device, which may be called a terminal, a mobile station (MS) and the like. The UE may be a portable device such as a notebook computer, a cellular phone, a personal digital assistant (PDA), a smartphone and a multimedia device or a fixed device such as a personal computer (PC) and a vehicle mounted device. The UE can perform communication through a 3GPP spectrum such as LTE and/or a non-3GPP spectrum such as Wi-Fi and a public safety spectrum.

Proximity Services or Proximity-based Services (ProSe): a service that enables discovery, direct communication, communication through a base station and communication through a third device between devices in physical proximity to each other. User plane data is exchanged through a direct data path (or direct mode data path) without passing through a 3GPP core network (e.g., EPC). This is also called D2D (Device-to-Device) service.

Proximity: Proximity of a UE to another UE is determined according to whether predetermined proximity criteria are fulfilled. The proximity criteria may be different for discovery and ProSe communication. In addition, the proximity criteria may be set as a controlled object of an operator.

ProSe Discovery: a process for identifying that a UE that is in proximity of another UE using E-UTRA.

ProSe Communication: communication between two UEs in proximity by means of an E-UTRAN communication path established between the UEs. The communication path can be established directly between the UEs or routed via local eNB(s).

ProSe-enabled UE: a UE that supports ProSe discovery and/or ProSe communication, which is called a UE in the following description.

ProSe-enabled Network: a network that supports ProSe discovery and/or ProSe communication, which is called a network in the following description.

ProSe E-UTRA Communication: ProSe communication using a ProSe E-UTRA communication path.

ProSe-assisted WLAN direct communication: ProSe communication using ProSe assisted WLAN direct communication path.

ProSe Group Communication: one-to-many ProSe communication between two or more ProSe-enabled UEs in proximity by means of a common communication path established between the ProSe-enabled UEs.

ProSe UE-to-Network Relay: a form of relay in which a ProSe-enabled public safety UE acts as a ProSe communication relay between a ProSe-enabled public safety UE and the Prose-enabled network using E-UTRA.

ProSe UE-to-UE Relay: a form of relay in which a ProSe-enabled public safety UE acts as a ProSe communication relay between two other ProSe-enabled public safety UEs.

Radio Access Network (RAN): a unit including NodeB, eNodeB and a radio network controller (RNC) that controls the NodeB and eNodeB in a 3GPP network. The RAN is present between a UE and a core network and provides connection to the core network.

Home Location Register (HLR)/Home Subscriber Server (HSS): a database having subscriber information of a 3GPP network. The HSS can perform configuration storage, identity management, user status storage and the like.

RAN Application Part (RANAP): an interface between a RAN and a core network control node (MME (Mobility Management Entity)/SGSN (Serving GPRS (General Packet Radio Service) Supporting Node)/MSC (Mobile Switching Center)).

Public Land Mobile Network (PLMN): a network configured to provide a mobile communication service to individuals. The PLMN can be configured per operator.

Non-Access Stratum (NAS): a functional layer for exchanging signaling and traffic messages between a UE and a core network in UMTS protocol stack. The NAS supports UE mobility and a session management procedure for establishing and maintaining IP connection between a UE and a packet data network gateway (PDN GW).

HNB (Home NodeB): customer premises equipment (CPE) that supports UMTS Terrestrial Radio Access Network (UTRAN) coverage. Refer to standard document TS 25.467 for details.

Home eNodeB (HeNodeB): customer premises equipment (CPE) that provides evolved-UTRAN (E-UTRAN) coverage.t). Refer to standard document TS 36.300 for details.

Closed Subscriber Group (CSG): an element of a CSG of an H(e)NB and a subscriber group permitted to access one or more CSG cells in a public land mobile network (PLMN).

Local IP Access (LIPA): Access of an IP capable UE to an entity having a different IP function within the same residential/enterprise IP network via an H(e)NB. LIPA traffic is merely an operator network. In a 3GPP release-10 system, the LIPA provides access to resources on a local network (i.e., a network located in a customer house or company via an H(e)NB.

Selected IP Traffic Offload (SIPTO): In a 3GPP release-10 system, an operator supports transfer of user traffic by selecting a packet data network gateway (PGW) in physical proximity to a UE in an EPC network.

Packet Data Network (PDN) connection: logical connection between a UE indicated by one IP address (one IPv4 address and/or one IPv6 prefix) and a PDN represented by an access point name (APN).

EPC (Evolved Packet Core)

Figure 1:
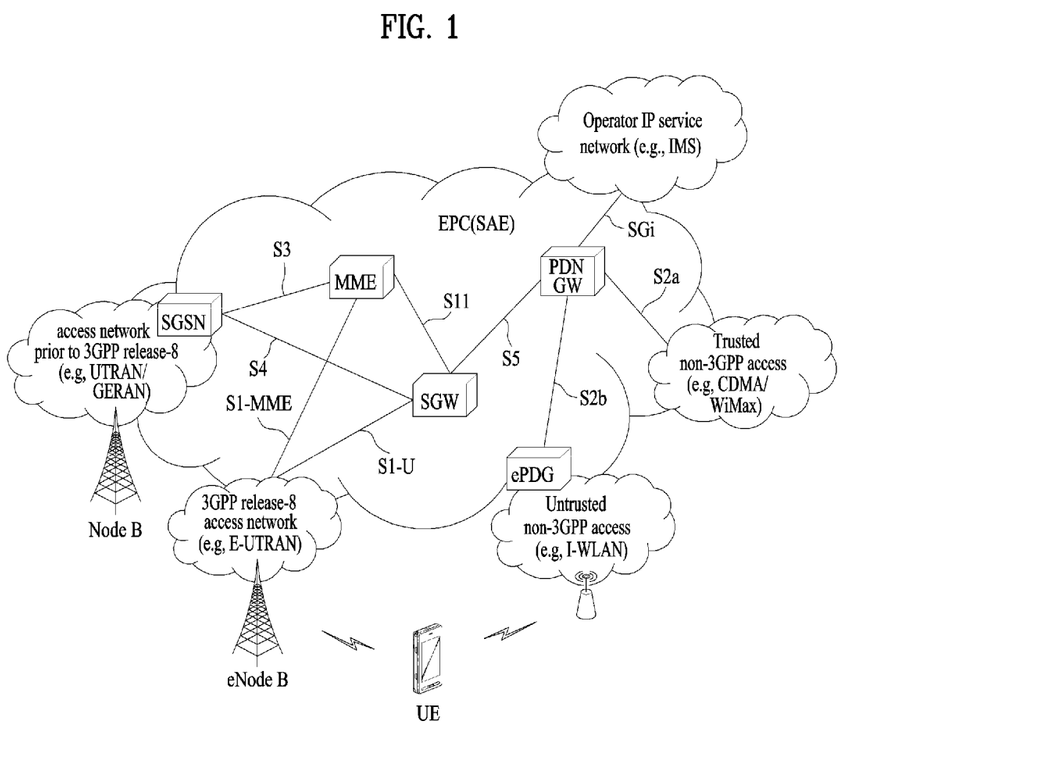
FIG. 1 illustrates a rough structure of an evolved packet system (EPS) including an evolved packet core (EPC)

FIG. 1 is a view schematically illustrating the architecture of an Evolved Packet System (EPS) including an Evolved Packet Core (EPC)

The EPC is a core element of System Architecture Evolution (SAE) for improving the performance of 3GPP technology. SAE corresponds to a study item for deciding a network structure supporting mobility among various types of networks. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separate sub-domains, e.g., circuit-switched (CS) sub-domain for sound and packet-switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Control Mechanism for Providing ProSe

The present invention provides a control mechanism for supporting a ProSe or D2D service in a mobile communication system such as 3GPP evolved packet system (EPS).

Due to increasing user demand for social network services (SNSs) and the like, detection/discovery between users/devices in physical proximity and a special application/service (i.e., proximity-based application/service) are demanded. To provide such services, use cases, scenarios and available service requirements for ProSe are under discussion even in 3GPP mobile communication systems.

ProSe use cases may include commercial/social services, network offloading, public safety, integrations of existing infrastructure services (in order to secure consistency of user experience including reachability and mobility) and the like. In addition, use cases and service requirements with respect to public safety when E-UTRAN coverage is not provided are under discussion. (In this case, the use cases and requirement need to meet the regulations and operator policy of a specific area and to be restricted to a specific frequency band and specific UEs designated for public safety.)

Particularly, the scope of ProSe being discussed in 3GPP assumes that the proximity-based application/service is provided via LTE or WLAN and that discovery and communication between devices are performed under control of an operator/network.

Figure 2:
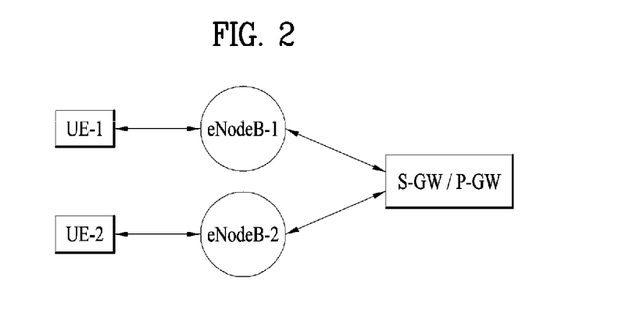
FIG. 2 illustrates a default data path through which two UEs communicate in the EPS.

FIG. 2 illustrates a default data path through which two UEs communicate in an EPS. That is, FIG. 2 illustrates a data path between UE-1 and UE-2 in a normal case in which ProSe is not applied to UE-1 and UE-2. Such default data path passes through a base station (i.e. eNodeB or home eNodeB) and gateway nodes (i.e. EPC or operator network). For example, as shown in FIG. 2, data from UE-1 can be delivered to UE-2 via eNodeB-1, S-GW/P-GW and eNodeB-2 and data from UE-2 can be sent to UE-1 via eNodeB-2, S-GW/P-GW and eNodeB-1 during exchange of data between UE-1 and UE-2. While FIG. 2 shows that UE-1 and UE-2 camp on different eNodeBs, UE-1 and UE-2 may camp on the same eNodeB. Furthermore, FIG. 2 illustrates that the two UEs are served by the same S-GW and P-GW, services in various combinations are possible. That is, the UEs may be served by the same S-GW and different P-GWs, by different S-GWs and the same P-GW, and by different S-GWs and different P-GWs.

In the present invention, such default data path can be called an infrastructure path (or an infrastructure data path or an infrastructure communication path). In addition, communication through such infrastructure data path can be called infrastructure communication.

Figure 3:
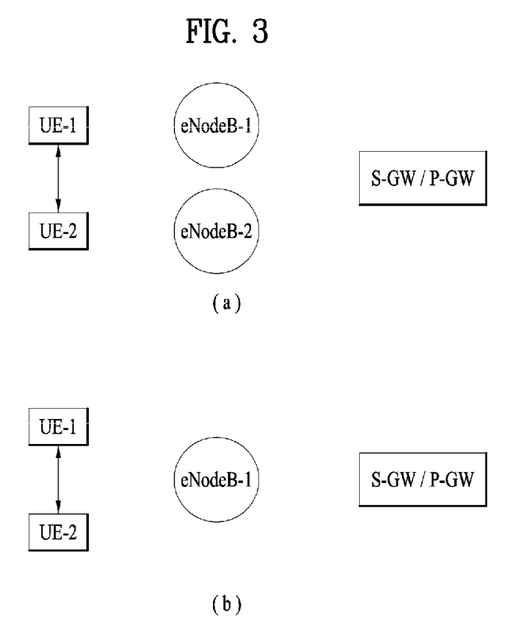
FIG. 3 illustrates a ProSe based direct mode data path between two UEs.

FIG. 3 illustrates a direct mode data path between two UEs based on ProSe. Such direct mode communication path does not pass through a base station (i.e. eNodeB or home eNodeB) and gateway nodes (i.e. EPC).

FIG. 3(a) illustrates a case in which UE-1 and UE-2 exchange data through the direct mode data path while respectively camping on different eNodeBs (i.e. eNodeB-1 and eNodeB-2). FIG. 3(b) illustrates a case in which UE-1 and UE-2 exchange data through the direct mode data path while camping on the same eNodeB (i.e. eNodeB-1).

In the meantime, it is noted that a control plane path can be formed via a base station and a core network while a user plane data path is directly formed between UEs without passing through a base station or gateway node, as shown in FIG. 3. Control information exchanged through the control plane path may be information related to session management, authentication, authorization, security, charging and the like. In the case of communication between UEs served by different eNodeBs, as shown in FIG. 3(a), control information about UE-1 can be exchanged with a control node (e.g., MME) of the core network through eNodeB-1 and control information about UE-2 can be exchanged with the control node (e.g., MME) of the core network through eNodeB-2. In the case of communication between UEs served by the same eNodeB, as shown in FIG. 3(b), control information about UE-1 and UE-2 can be exchanged with a control node (e.g., MME) of the core network through eNodeB-1.

Figure 4:
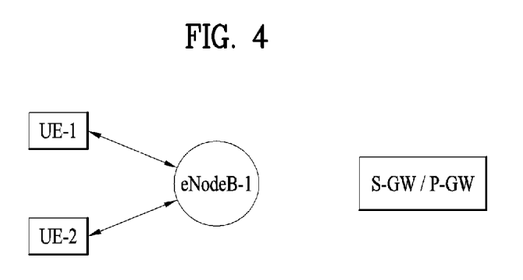
FIG. 4 illustrates a ProSe based locally-routed data path between two UEs.

FIG. 4 illustrates a locally routed data path between two UEs based on ProSe. While the ProSe communication data path between UE-1 and UE-2 is generated via eNodeB-1, as shown in FIG. 4, the ProSe communication data path does not pass through gateway nodes (i.e., EPC) operated by the operator. When the locally-routed data path is established between the UEs served by the same eNodeB, as shown in FIG. 4, control information about UE-1 and UE-2 can be exchanged with a control node (e.g., MME) of the core network via eNodeB-1.

In the present invention, the communication path described in FIGS. 3 and 4 can be referred to as a direct data path, a data path for ProSe, a ProSe based data path or a ProSe communication path. In addition, communication through such direct data path can be referred to as direct communication, ProSe communication or ProSe based communication.

When an E-UTRA ProSe communication path between UEs is not available, as described above with reference to FIGS. 2, 3 and 4, the E-UTRA ProSe communication path switches to an infrastructure path such that a user traffic session (or user data transmission/reception, communication and the like) continues. The E-UTRA ProSe communication path between UEs may not be available in the following cases.

1) Case in which two UEs communicating using the E-UTRA ProSe communication path established therebetween cannot communicate with each other through a direct mode data path anymore because the UEs are spaced apart from each other although the UEs stay in E-UTRAN.

2) Case in which at least one of two UEs communicating through the E-UTRA ProSe communication path performs radio access technology (RAT) change to GERAN or UTRAN. For reference, conventional technology provides ProSe through E-UTRAN, WLAN and a spectrum for public safety and thus a UE cannot be provided with ProSe when camping on GERAN or UTRAN.

In an example of case 2), particularly, a UE may perform RAT change to GERAN or UTRAN in order to perform circuit switched fallback (CSFB) or single radio voice call continuity (SRVCC). In this case, if the CSFB or SRVCC does not support packet switched (PS) handover, PS service is suspended as a result of the CSFB or SRVCC procedure and thus a user traffic session, which has been performed through a ProSe communication path, also needs to be suspended.

However, there are no methods of suspending ProSe communication and resuming suspended ProSe communication when the E-UTRA ProSe communication path is not available as described above.

Accordingly, the present invention proposes a mechanism of efficiently providing proximity based services in mobile communication system such as 3GPP EPS. The present invention provides the following scenarios.

● At least one of two UEs communicating through an E-UTRA ProSe communication path performs
  CSFB to GERAN without PS behavior
  CSFB to UTRAN without PS behavior
  SRVCC to GERAN without DTM (Dual Transfer Mode) support
  SRVCC to GERAN with DTM but without DTM HO (Dual Transfer Mode Handover) support
  SRVCC to UTRAN without PS HO
  vSRVCC (Single Radio Video Call Continuity) to UTRAN without PS HP support The aforementioned scenarios are assumed as CSFB/SRVCC without PS handover in the following. The above-mentioned CSFB scenario includes a CSFB scenario for voice call (mobile originated and mobile terminated) and refers to a case in which a UE changes RAT from E-UTRAN to UTRAN or GERAN due to a CSFB procedure.

RAT Change During Proximity Service Communication

The proximity based service provision mechanism proposed by the present invention is composed of a combination of one or more of 1) operation of a UE (referred to as a first UE hereinafter) to perform CSFB/SRVCC without PS handover during communication through the E-UTRA ProSe communication path, 2) operation of a ProSe communication counterpart UE (referred to as a second UE hereinafter) of the first UE (i.e. UE performing operation 1), 3) operation of an MME (referred to as a first MME hereinafter) that serves the first UE, 4) operation of an MME (referred to as a second MME hereinafter) that serves the second UE and 5) operation performed when the first UE returns to E-UTRAN after termination of voice call, which will be described below. A detailed description will be given of operations 1 to 5 proposed by the present invention.

1. Operation of UE (First UE) that Performs CSFB/SRVCC without PS Handover During Communication Through E-UTRA ProSe Communication Path According to the present invention, a UE that performs CSFB/SRVCC without PS handover during communication through the E-UTRA ProSe communication path executes one or more of the following operations 1-1 to 1-6 prior to RAT change to target RAT of CSFB or SRVCC.

1-1) The UE (first UE) that performs CSFB/SRVCC without PS handover during communication through the E-UTRA ProSe communication path determines whether to suspend or release one of i) IP flow, ii) IP traffic, iii) PS service, iv) IP connection, v) bearer and vi) PDN connection, which are being transmitted/received to/from the counterpart UE of ProSe communication or used therebetween. If one or more of IP flows/IP traffic/PS services/IP connections/bearers/PDN connections are being communicated or used, the UE may make different decisions for the respective items.

The determination may be based on at least one of a) IP flow/IP traffic/PS service/IP connection/bearer/PDN connection, which are being transmitted/received to/from the counterpart UE of ProSe communication or used therebetween, b) QoS characteristics of IP flow/IP traffic/PS service/IP connection/bearer/PDN connection, which are being communicated with the counterpart UE of ProSe communication or used by the corresponding UE, c) configuration information (which may be set by at least one of the UE and the operator), d) information received from the network, e) user preference, f) operator policy, g) whether the counterpart UE of ProSe communication is within network coverage (i.e., whether the counterpart UE is served by E-UTRAN) and h) the type of an application being used with the counterpart UE of ProSe communication.

1-2) The UE (first UE) that performs CSFB/SRVCC without PS handover during communication through the E-UTRA ProSe communication path explicitly or implicitly transmits at least one of the following pieces of information to the counterpart UE (second UE) of ProSe communication. The following information can be transmitted to the second UT anytime prior to RAT change after the first UE recognizes that PS handover is not supported or performed.

i) Information indicating suspension (or discontinuity or temporary suspension) of E-UTRA ProSe communication/E-UTRA ProSe communication path/ProSe communication/IP flow being transmitted/IP traffic/PS service/IP connection/bearer/PDN connection
  ii) Information indicating release (or suspension) of E-UTRA ProSe communication/E-UTRA ProSe communication path/ProSe communication/IP flow being transmitted/IP traffic/PS service/IP connection/bearer/PDN connection
  iii) Information about the reason for suspension/release with respect to the suspension/release, for example, one or more information such as CSFB, SRVCC, RAT change, no PS handover and the like, which may be provided as one or more pieces of information or provided in a combined form.
  iv) Information for switching the E-UTRA ProSe communication path to the infrastructure path
  v) Information for suspending E-UTRA ProSe communication/E-UTRA ProSe communication path/ProSe communication
  vi) Information for releasing E-UTRA ProSe communication/E-UTRA ProSe communication path/ProSe communication
  vii) Information on whether the counterpart UE of ProSe communication is within network coverage (i.e., whether the counterpart UE is served by E-UTRAN
  viii) Information indicating that D2D service/ProSe is (temporarily) unavailable Information iv, v and vi from among the information explicitly/implicitly transmitted from the first UE to the second UE may be associated with information about the IP flow/IP traffic/PS service/IP connection/bearer/PDN connection, which are being transmitted/received to/from the second UE or being used therebetween.

In addition, when one or more of IP flows/IP traffic/PS services/IP connections/bearers/PDN connections are communicated between the first UE and the second UE, different information for respective items may be transmitted to the second UE. Here, in the case of common information, the same information may be repeatedly included or the common information may be included as a common form in the information transmitted to the second UE. For example, when the first UE performs ProSe communication of two IP flows with the second UE, the first UE can transmit information for switching the E-UTRA ProSe communication path to the infrastructure path for IP flow#1 and transmit information for releasing the E-UTRA ProSe communication path for IP flow#2. While IP flow#1 and IP flow#2 are described in the above example, bearer#1 and bearer#2 or IP traffic#1 and IP traffic#2 are possible, which can be applied to the present invention.

Furthermore, the UE (i.e. the first UE) that performs CSFB/SRVCC without PS handover during communication through the E-UTRA ProSe communication path can transmit, to the counterpart UE (i.e., the second UE) of ProSe communication, various information related to suspension/release of ProSe communication as well as the aforementioned information.

The various information related to suspension/release of ProSe communication may be i) transmitted through a control message/AS control message/NAS control message/SIP (Session Initiation Protocol) message, a control message for ProSe, defined for the present invention, or the like and ii) included in a header of user data or a header of an ACK message for acknowledgement of reception of the user data and transmitted. In addition, a message transmitted from the first UE to the second UE may (implicitly) indicate the aforementioned information.

The UE (i.e. the first UE) that performs CSFB/SRVCC without PS handover during communication through the E-UTRA ProSe communication path executes one of the following operations 1-3 to 1-6 according to a method of processing IP flow/IP traffic/PS service/IP connection/bearer, which are being transmitted/received to/from the counterpart UE of ProSe communication or being used therebewteen. If the first UE communicates a plurality of IP flows with the counterpart UE of ProSe communication and the IP flows are processed through different methods, one or more of operations 1-3 to 1-6 can be appropriately performed according to the IP flows. For example, three IP flows are communicated between the UEs, the first UE can perform operation 1-3 for IP flow#1 and IP flow#2 and perform operation 1-5 for IP flow#3.

In addition, the first UE may additionally perform operation of informing a user of communication/packet service/data service/D2D service/(temporary) suspension of ProSe/(temporary) unavailability of ProSe with respect to the second UE. For example, the first UE can be configured to display an appropriate message about communication with the second UE to the user.

1-3) The UE (i.e. the first UE) that performs CSFB/SRVCC without PS handover during communication through the E-UTRA ProSe communication path transmits, to a serving MME thereof, a message for requesting switching of the ProSe communication path to the infrastructure path. Here, the request may be at least one of i) request for generation of bearer/PDN connection, ii) request for generation of bearer/PDN connection related context information and iii) request for update of the maintained bearer/PDN connection related context information, which are necessary for the network when a user traffic session that was communicated through the ProSe communication path is communicated through the infrastructure path. In addition, the user traffic session may be requested to be moved from the ProSe communication path to the infrastructure path (that is, requested to continue communication after movement).

Furthermore, the aforementioned request message (i.e., the message by which the first UE requests the MME to switch the ProSe communication path to the infrastructure path) may be a conventional message transmitted from the UE to the MME or a new message.

The UE may transmit the request to a network node other than the MME. For example, the other network node may be a RAN node (e.g., eNodeB), a core network node (e.g., S-GW, P-GW, PCRF, HSS, ANDSF, node for proximity service/server/function/entity), an IMS node (P-CSCF, S-CSCF, application server or the like) and the like. This may be applied to the present invention.

Additionally, the first UE can i) release bearer/IP connection/PDN connection, used for ProSe communication, ii) release resources allocated to bearer/IP connection/PDN connection iii) release bearer/IP connection/PDN connection related context and/or iv) deactivate bearer/IP connection/PDN connection.

1-4) The UE (first UE) that performs CSFB/SRVCC without PS handover during communication through the E-UTRA ProSe communication path can i) suspend bearer/IP connection/PDN connection, used for ProSe communication, ii) suspend resources allocated to bearer/IP connection/PDN connection, iii) suspend bearer/IP connection/PDN connection related context and/or iv) deactivate bearer/IP connection/PDN connection. The first UE may additionally transmit, to the serving MME thereof, a message representing the aforementioned operations.

1-5) The UE (first UE) that performs CSFB/SRVCC without PS handover during communication through the E-UTRA ProSe communication path can i) release bearer/IP connection/PDN connection, used for ProSe communication, ii) release resources allocated to bearer/IP connection/PDN connection, iii) release bearer/IP connection/PDN connection related context and/or iv) deactivate bearer/IP connection/PDN connection. The first UE may additionally transmit, to the serving MME thereof, a message representing the aforementioned operations.

1-6) The UE (first UE) that performs CSFB/SRVCC without PS handover during communication through the E-UTRA ProSe communication path offloads an IP flow that is being ProSe-communicated to a WLAN. Offloading to the WLAN may be EP-routed or NSWO (Non-Seamless WLAN Offloading). Offloading to the WLAN may be performed before the first UE executes RAT change and performed after the first UE executes RAT change.

Furthermore, messages transmitted from the UE to the MME in operations 1-3 to 1-5 may be transmitted as a single message. For example, when the first UE needs to transmit the message specified in operation 1-3 to the MME for IP flow#1 and to transmit the message specified in operation 1-5 to the MME for IP flow#2, information related to operations 1-3 and 1-5 can be included in a single message and sent to the MME.

2. Operation of ProSe Communication Counterpart UE (Second UE) of UE (First UE) that Performs CSFB/SRVCC without PS Handover During Communication Through E-UTRA ProSe Communication Path Upon reception of the information described in operation 1-2 from the first UE, the second UE performs one or more of the aforementioned operations 1-3 to 1-6 on the basis of at least one of i) the received information, ii) configuration information (which is set by the UE and/or the operator), iii) information received from the network, iv) user preference and v) operator policy.

For example, the second UE performs operation 1-3 when the message transmitted from the first UE to the second UE includes information representing switching of the E-UTRA ProSe communication path to the infrastructure path and performs operation 1-4 when the message transmitted from the first UE includes information representing suspension of the E-UTRA ProSe communication path.

When the message transmitted from the first UE includes information indicating switching of the E-UTRA ProSe communication path to the infrastructure path for IP flow#1 and includes information indicating release of the E-UTRA ProSe communication path to the infrastructure path for IP flow#2, the second UE performs operations 1-3 and 1-5.

Furthermore, the second UE may additionally perform operation of informing the user of communication/packet service/data service/D2D service/(temporary) suspension of ProSe/(temporary) unavailability of ProSe with respect to the counterpart UE (i.e. first UE). For example, the second UE can be configured to display an appropriate message about communication with the first UE to the user.

3. Operation of Serving MME (First MME) of UE (First UE) that Performs CSFB/SRVCC without PS Handover During Communication Through E-UTRA ProSe Communication Path 3-1) The first MME may perform one or more of the following operations for the first UE.
i) Generation of (new) PDN connection if there is no PDN connection for a user traffic session that was communicated through the ProSe communication path
ii) Generation of (new) bearer if there is no bearer for the user traffic session that was communicated through the ProSe communication path
iii) Update of bearer related context information stored with respect to the ProSe communication path if the bearer related context information is present. For example, when the bearer context information records (marks) that the bearer is a bearer for the ProSe communication path, a) recording (marking) is changed to a bearer for the infrastructure path or b) recording (marking) of the bearer for the ProSe communication path is deleted.
iv) deactivation/release of bearer related context information stored with respect to the ProSe communication path if the bearer related context information is present.
v) The user traffic session communicated through the ProSe communication path is moved to the infrastructure path (i.e., communication is continued).

3-2) The first MME can perform one or more of the following operations for the ProSe communication counterpart UE (second UE) of the first UE.
i) The first MME transmits the information described in the aforementioned operation 1-2 (i.e., information transmitted from the first UE to the second UE) to the second UE.
ii) The first MME performs one or more of operations i to v of the aforementioned operation 3-1 for the second UE. In the case of operations i and ii, as described in operation 3-2, the first MME can directly perform the operations when the first MME serves the second UE. However, when the first MME does not serve the second UE or even when the first MME serves the second UE, the first MME can explicitly or implicitly request another network node to perform operations i and ii described in operation 3-2.

Furthermore, the MME may perform operations 3-1 and 3-2 by receiving the request/notification message described in operations 1-3 to 1-5 from the first UE. If the MME has information about ProSe communication of the first UE, the MME can perform operations 3-1 and 3-2 even when the MME does not receive the request/notification message described in operations 1-3 to 1-5. That is, the MME can perform operations 3-1 and 3-2 by recognizing that the first UE performs CSFB or SRVCC or needs to perform RAT change due to CSFB or SRVCC.

In addition, operation of the first MME can be performed on the basis of at least one of i) information included in or intended by the request message received from the first UE, ii) bearer type (guaranteed bit rate (GBR) or non-GBR), iii) access point name (APN) information, iv) subscriber information, v) configuration information, vi) information received from another network node, vii) user preference, viii) operator policy, ix) local policy, x) network situation (load/congestion and the like), xi) whether the ProSe communication counterpart UE of the first UE is within network coverage (i.e., whether the counterpart UE is served by E-UTRAN), which are described in the aforementioned operation 1-3, and the like. For example, operation iii described in operation 3-1 is performed when the ProSe communication path related bearer is non-GBR and operation iv described in operation 3-1 is performed when the ProSe communication path related bearer is GBR. However, the present invention is not limited thereto.

Furthermore, operation of the first MME may include interaction for synchronization of i) context information and ii) operation with an S-GW and/or a P-GW.

4. Operation of MME (Second MME) of ProSe Communication Counterpart UE (Second UE) of UE (First UE) that Performs CSFB/SRVCC without PS Handover During Communication Through E-UTRA ProSe Communication Path The second MME performs the aforementioned operation 3-1 upon reception of the request/notification message described in the aforementioned operations 1-3 to 1-5 from the second UE.

5. Operation Executed when UE (First UE) Performing CSFB/SRVCC without PS Handover During Communication Through E-UTRA ProSe Communication Path Returns to E-UTRAN after Termination of Voice Call When the first UE performs the aforementioned operation 1-4, the first UE checks whether ProSe communication with the second UE is still available (through a method such as discovery).

If ProSe communication is available, the first UE resumes i) bearer/IP connection/PDN connection which were used for ProSe communication, ii) resumes resources allocated to bearer/IP connection/PDN connection, iii) resumes context related to bearer/IP connection/PDN connection and/or iv) activates bearer/IP connection/PDN connection, in order to resume ProSe communication.

Additionally, the first UE can transmit, to the second UE, information indicating resumption of E-UTRA ProSe communication/E-UTRA ProSe communication path/ProSe communication.

Furthermore, the first UE can request the first MME to resume E-UTRA ProSe communication/E-UTRA ProSe communication path/ProSe communication with the second UE. Then, the first UE can resume communication with the second UE through the ProSe communication path.

If ProSe communication is unavailable, the first UE performs operation for resuming communication with the second UE through the infrastructure path. To this end, the first UE transmits, to the MME, a message for requesting switching of the ProSe communication path to the infrastructure path.

While the CSFB/SRVCC scenario in which PS service is suspended has been described with respect to the aforementioned operations 1 to 5 for convenience, the operations can be extended and applied to all scenarios in which the ProSe communication path needs to switch to the infrastructure path as well as a CSFB/SRVCC scenario in which PS handover is supported.

In addition, the aforementioned proximity based service providing mechanism may be applied to ProSe-assisted WLAN direct communication as well as ProSe E-UTRA communication. Alternatively, the aforementioned proximity based service provision mechanism may be applied to ProSe E-UTRA communication only, and the UE may continuously perform ProSe-assisted WLN direct communication being performed with the second UE without suspending the same even if the first UE changes RAT from E-UTRAN to UTRAN or GERAN due to CSFB/SRVCC.

Furthermore, the present invention is not limited to LTE/EPC networks and is applicable to UMTS/EPS mobile communication systems including 3GPP access networks (e.g., UTRAN/GERAN/E-UTRAN) and non-3GPP access networks (e.g., WLAN and the like). In addition, the present invention may be applied to any other wireless mobile communication systems in environments in which network control is applied.

Figure 5:
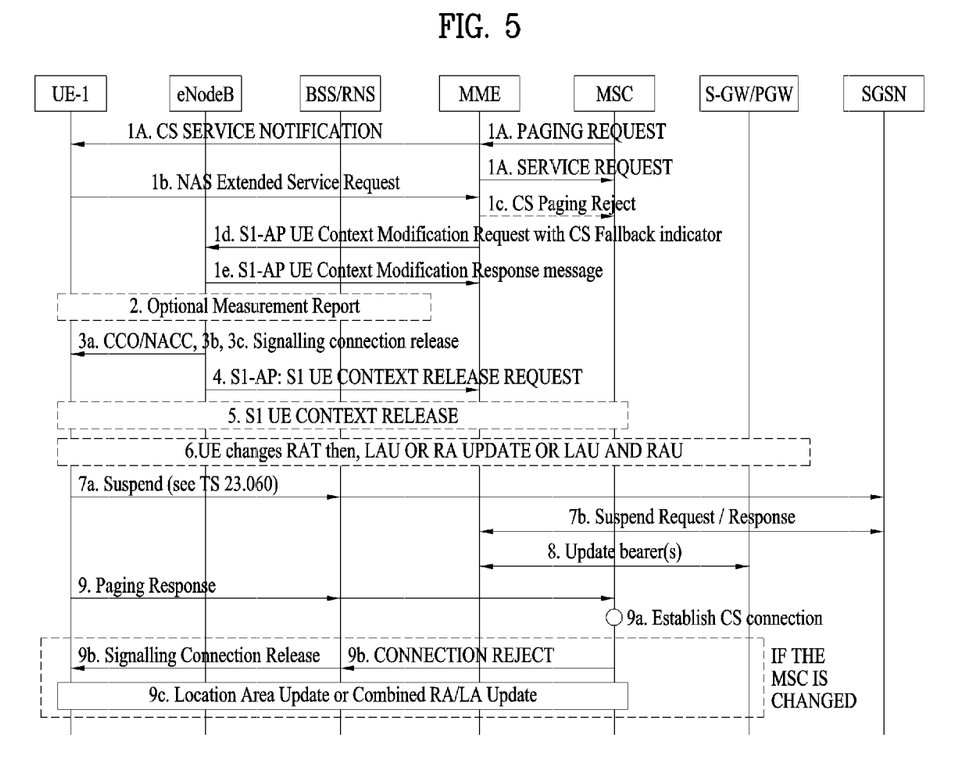
FIG. 5 is a reference diagram for illustrating an embodiment to which the present invention is applicable.

FIG. 5 is a reference view for illustrating a method for supporting CSFB without PS handover for terminating call of a UE according to the aforementioned embodiments of the present invention.

In FIG. 5, it is assumed that a UE (referred to as UE-1) that performs CSFB/SRVCC without PS handover during communication via the E-UTRA ProSe communication path is communicating with a ProSe communication counterpart UE (referred to as UE-2 hereinafter) (not shown) using the ProSe communication path.

In step 1A of FIG. 5, a mobile switching center (MCS) receives a mobile terminating (MT) voice call to UE-1 and transmits a paging request message to an MME. Upon reception of the paging request message, the MME sends a CS service notification message for notifying UE-1 of the MT voice call. A description will be given of RAT change operation depending on time when the UE recognizes that PS service is suspended or PS handover is not supported/performed due to a CSFB procedure.

1) A description will be given of a case in which the UE recognizes that PS service is suspended or PS handover is not supported/performed due to CSFB when i) the CSFB procedures begins, ii) the UE recognizes beginning of the CSFB procedure or iii) the CSFB procedure is initiated.

Upon reception of the circuit switched (CS) service notification message transmitted from the MME in step 1A, UE-1 performs the operation (i.e., operation 1) above-described respect to the UE performing CSFB/SRVCC without PS handover during communication via the E-UTRA ProSe communication path in the present invention.

For example, UE-1 can use an extended service request message of step 1b in order to send the request described in operation 1-3 to the MME. That is, UE-1 can transmit information related to the request described in operation 1-3 by adding a new information element or parameter to the extended service request message.

For reference, the case in which the UE recognizes that PS service is suspended or PS handover is not supported/performed due to CSFB when i) the CSFB procedures begins, ii) the UE recognizes beginning of the CSFB procedure or iii) the CSFB procedure is initiated corresponds to a case in which the UE does not support the dual transfer mode (DTM).

2) A description will be given of a case in which the UE recognizes that PS service will be suspended or PS handover will not be supported/performed according to information (which may be explicit or implicit) received from the network during execution of the CSFB procedure.

When UE-1 receives a cell change order message from an eNodeB in step 3a of FIG. 5 or receives an RRC connection release message from the eNodeB in step 3b or 3c of FIG. 5, UE-1 perform an operation (i.e. operation 1) described above with respect to the UE performing CSFB/SRVCC without PS handover during communication via the E-UTRA ProSe communication path in the present invention.

For example, UE-1 can use the conventional NAS message or a message newly defined for the present invention in order to send the request described in operation 1-3 to the MME.

Upon reception of the message (refer to operation 1-2) sent from UE-1 in operation 1 or 2 aforementioned with respect to FIG. 5, UE-2 performs operation (i.e. operation 2) of the ProSe communication counterpart UE or UE-1 on the basis of the received message.

Upon reception of the message sent from UE-1 in operation 1 or 2 aforementioned with respect to FIG. 5, the MME performs operation (i.e. operation 3-1) of the serving MME of UE-1 on the basis of the received message.

A description will be given of an embodiment of the present invention for service continuity of CSFB. For service continuity, path switching from the ProSe communication path to an EPC path needs to be supported when the ProSe communication path is no longer available.

That is, a UE (UE-1) that performs communication with another UE (UE-2) through the ProSe communication path needs to perform the CSFB procedure for a voice call, and the ProSe communication path between UE-1 and UE-2 is not available after UE-1 changes RAT from E-UTRAN to UTRAN/GERAN. Furthermore, once UE-1 changes RAT from E-UTRAN to UTRAN/GERAN, UE-1 cannot perform ProSe related operation including path switching operation. If path switching is not performed, communication between UE-1 and UE-2 will be abruptly suspended and overall performance will be deteriorated.

To solve the aforementioned problem, the UE communicating with the other UE through the ProSe communication path can operate as follows in the embodiment of the present invention.

Before RAT change from E-UTRAN to UTRAN/GERAN during the CSFB procedure for voice call
While the UE stays in E-UTRAN during the CSFB procedure
Before the UE initiates the CSFB procedure
Prior to initiation of the CSFB procedure by the UE (the UE does not initiate the CSFB procedure and the network may have started the CSFB procedure for the UE)

In the aforementioned cases, the UE (i.e., UE-1) performs a switching procedure for changing the ProSe communication path to the EPC path for the user traffic session. Such path switching procedure includes i) transmission of a path switching request to the network and/or ii) transmission of a message/information for path switching to a peer UE of ProSe communication.

In addition, the UE (i.e. UE-1) may delay the RAT change or CSFB procedure initiation (from the viewpoint of the UE) until the path switching procedure is terminated.

Figure 6:
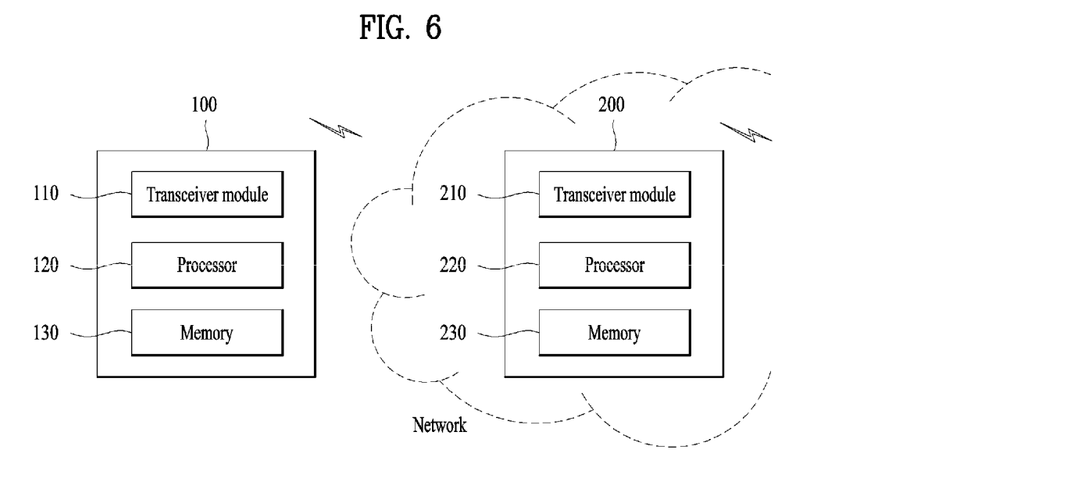
FIG. 6 illustrates configurations of a UE and a network node device according to a preferred embodiment of the present invention.

FIG. 6 illustrates configurations of a UE and a network node according to a preferred embodiment of the present invention.

Referring to FIG. 6, a UE 100 according to the present invention may include a transceiver module 110, a processor 120 and a memory 130. The transceiver module 110 may be configured to transmit various signals, data and information to an external device and to receive various signals, data and information from the external device. The UE 100 may be coupled to the external device in a wired and/or wireless manner. The processor 120 may control the overall operation of the UE 100 and may be configured to execute functions of processing information to be transmitted/received by the UE 100 to/from the external device. The memory 130 may store processed information for a predetermined time and may be replaced by a component such as a buffer (not shown).

The UE 100 according to an embodiment of the present invention may be configured to participate in ProSe on the basis of whether ProSe initiated by a network is available or a ProSe UE discovery result. The processor 120 of the UE 100 may be configured to transmit ProSe basic information to a network node device 200 using the transceiver module 110. The processor 120 may be configured to receive information indicating whether ProSe is allowed from the network node device 200. The processor 120 may be configured to process signaling for setting up a direct data path between the UE 100 and another UE. The processor 120 may be configured to perform direct communication with the UE using the transceiver module 110. The processor 120 may be configured to transmit information on a ProSe execution result to the network node 200 using the transceiver module 110.

Referring to FIG. 6, the network node device 200 according to the present invention may include a transceiver module 210, a processor 220 and a memory 230. The transceiver module 210 may be configured to transmit various signals, data and information to an external device and to receive various signals, data and information from the external device. The network node device 200 may be coupled to the external device in a wired and/or wireless manner. The processor 220 may control the overall operation of the network node device 200 and may be configured to execute functions of processing information to be transmitted/received by the network node device 200 to/from the external device. The memory 230 may store processed information for a predetermined time and may be replaced by a component such as a buffer (not shown).

The network node device 200 according to an embodiment of the present invention may be configured to support ProSe among a plurality of UEs. The processor 220 of the network node device 200 may be configured to receive ProSe basic information from the UE 100 or another network node device using the transceiver module 210. The processor 220 may be configured to transmit information indicating whether ProSe is permitted to the UE 100 using the transceiver module 210. The processor 220 may be configured to process signaling for supporting direct data path setup by the UE 100 with another UE. The processor 220 may be configured to receive information on a ProSe execution result from the UE 100 using the transceiver module 210.

The configurations of the UE 100 and the network node device 200 may be implemented such that the aforementioned embodiments of the present invention are independently applied or two or more thereof are simultaneously applied, and redundant parts are omitted for clarity.

The embodiments of the present invention may be achieved by various means, for example, hardware, firmware, software, or a combination thereof.

In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention is not intended to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The aforementioned embodiments of the present invention can be applied to various mobile communication systems.

The invention claimed is:
1. A method for changing radio access technology (RAT) of a first user equipment (UE) in a wireless communication system, comprising:
    transmitting information related to a user traffic session when the first UE recognizes suspension of a packet switched (PS) service during execution of proximity service (ProSe) communication; and
    the first UE changing RAT to a target RAT in which PS service is not supported.

2. The method according to claim 1, wherein the target RAT is a UTRAN (UMTS (Universal Mobile Telecommunications System) Terrestrial Radio Access Network)) or GERAN (GSM (Global System for Mobile Communication)/EDGE (Enhanced Data rates for Global Evolution) Radio Access Network).

3. The method according to claim 1, wherein the user traffic session is one of an IP flow, IP traffic, a packet switched service, IP connection, bearer and PDN connection.

4. The method according to claim 1, further comprising transmitting the user traffic session related information to a second UE corresponding to a ProSe communication target of the first UE,
wherein the user traffic session related information includes at least one of suspension of the user traffic session, release of the user traffic session, reason for suspension of the user traffic session, switching information of a ProSe communication path, information on suspension of ProSe communication, information on release of ProSe communication, information on whether the second UE is present within a network coverage and notification of unavailability of ProSe.

5. The method according to claim 4, further comprising transmitting a request message for switching the ProSe communication path to an infrastructure path to a serving mobility management entity (MME) of the first UE.

6. The method according to claim 4, further comprising performing at least one of operation of releasing the user traffic session, operation of releasing resources allocated to the user traffic session, operation of releasing a user traffic session related context and operation of deactivating the user traffic session.

7. The method according to claim 4, further comprising performing at least one of operation of suspending the user traffic session, operation of suspending resources allocated to the user traffic session, operation of suspending a user traffic session related context and operation of deactivating the user traffic session.

8. The method according to claim 1, further comprising offloading an IP flow being ProSe-communicated to a wireless local area network (WLAN).

9. The method according to claim 1, further comprising performing a voice call according to circuit switched fallback (CSFB).

10. A user equipment (UE) for changing radio access technology (RAT) in a wireless communication system, comprising:
a radio frequency (RF) unit; and
a processor,
wherein the processor is configured to transmit user traffic session related information upon recognizing suspension of a packet switched (PS) service during execution of proximity service (ProSe) communication and to change RAT to a target RAT in which PS service is not supported.

* * * * *